(12) United States Patent
Coceani et al.

(10) Patent No.: US 10,852,164 B2
(45) Date of Patent: *Dec. 1, 2020

(54) SENSOR DEVICE AND A METHOD OF CURRENT MODULATION SWITCHING USING A TWO-WIRE CURRENT INTERFACE

(71) Applicant: Infineon Technologies AG, Neubiberg (DE)

(72) Inventors: Lorenzo Coceani, Villach (AT); Bernhard Forster, Finkenstein (AT)

(73) Assignee: Infineon Technologies AG

( * ) Notice: Subject to any disclaimer, the term of this patent is extended or adjusted under 35 U.S.C. 154(b) by 0 days.

This patent is subject to a terminal disclaimer.

(21) Appl. No.: 16/904,157

(22) Filed: Jun. 17, 2020

(65) Prior Publication Data

US 2020/0318999 A1    Oct. 8, 2020

Related U.S. Application Data

(63) Continuation of application No. 15/978,505, filed on May 14, 2018, now Pat. No. 10,697,802.

(51) Int. Cl.
*G01D 5/244* (2006.01)
*G01K 1/00* (2006.01)

(52) U.S. Cl.
CPC ........... *G01D 5/24428* (2013.01); *G01K 1/00* (2013.01)

(58) Field of Classification Search
CPC .............................. G01D 5/22428; G01K 1/00

USPC ...................................................... 324/207.25
See application file for complete search history.

(56) References Cited

U.S. PATENT DOCUMENTS

| | | | |
|---|---|---|---|
| 8,283,876 B2 * | 10/2012 | Ji | ........................... H05B 45/18 315/309 |
| 9,621,140 B1 * | 4/2017 | Fernandez | ............... H03K 5/04 |

* cited by examiner

*Primary Examiner* — Nasima Monsur
*Assistant Examiner* — Rahul Maini
(74) *Attorney, Agent, or Firm* — Design IP

(57) ABSTRACT

A sensor device includes a two-pin current interface including an input pin configured to draw an input current and an output pin configured to output an output current, a sensor configured to generate a measurement signal, and a current modulator configured to generate a current pulse as the output current such that the output current toggles between at least two main current states based on the measurement signal. The current modulator is configured to modulate the output current such that the output current is increased, to a first current level greater than the at least two main current states, at an initial phase of the current pulse for a first duration, and to modulate the output current such that the output current is decreased, to a second level less than the at least two main current states, at a terminal phase of the current pulse for a second duration.

22 Claims, 5 Drawing Sheets

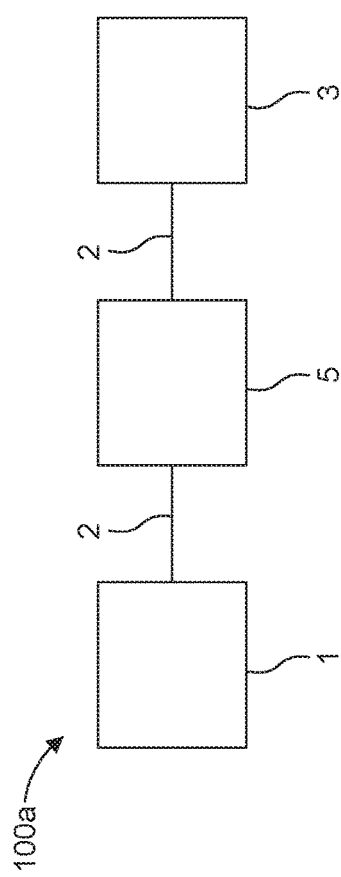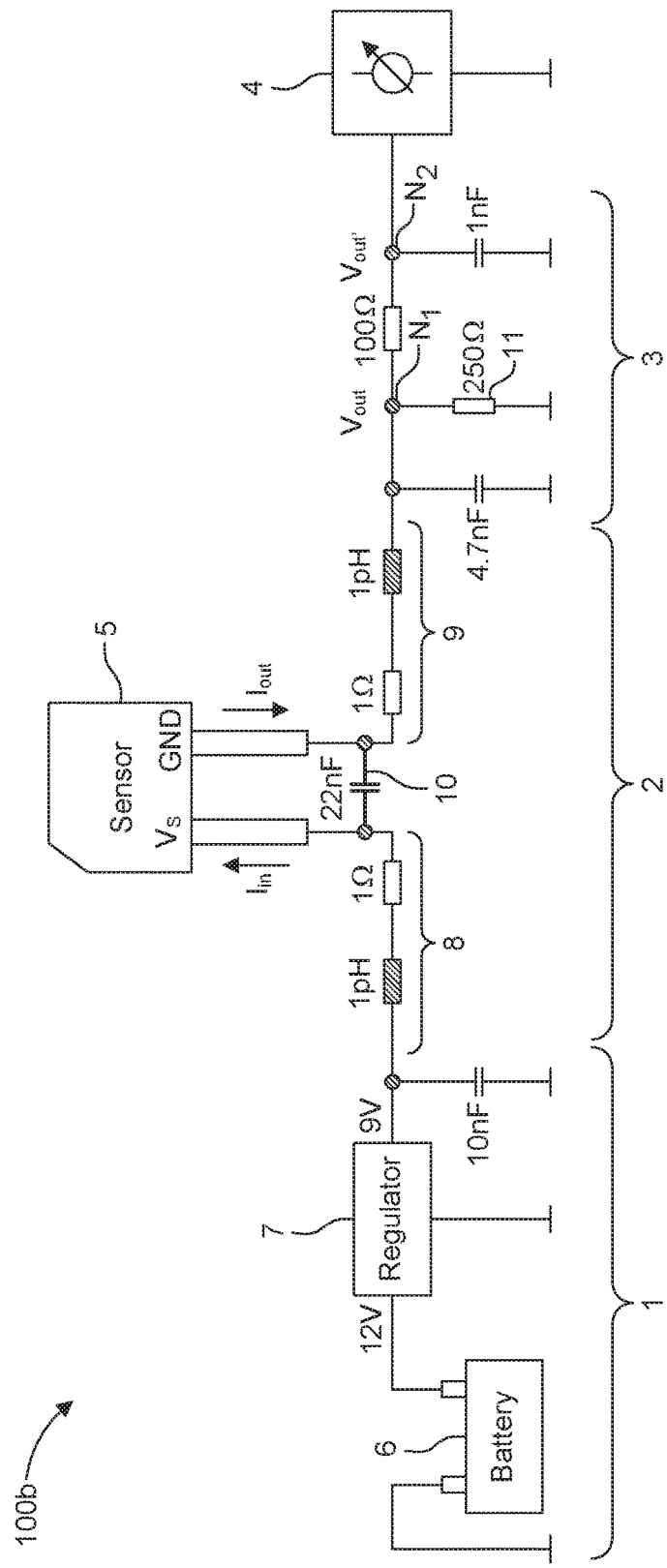

SENSOR DEVICE AND A METHOD OF CURRENT MODULATION SWITCHING USING A TWO-WIRE CURRENT INTERFACE

CROSS-REFERENCE TO RELATED APPLICATIONS

This application is a continuation of U.S. patent application Ser. No. 15/978,505 filed May 14, 2018, which is incorporated by reference as if fully set forth.

FIELD

The present disclosure relates generally to a device connected to a wire harness, and, more particularly, to a sensor device operating within the requirements of an RI 130 electromagnetic compatibility (EMC) test and a method of operating the same.

BACKGROUND

Two-wire current interfaces for pulse-width modulation (PWM) sensors are the standard for many automotive applications. For example, magnetic speed sensors are used in speed sensing for many applications in automotive industry, including wheel speed, engine speed, and transmission speed.

The automotive industry requires electronic components to pass an electromagnetic compatibility (EMC) test called RI 130. This test applies also to two-wire speed sensors, such as transmission speed sensors. In order to be able to pass this test, it has been identified that in parallel to the sensor a capacitor, typically of the size of 22 nF, has to be used. However, the use of the capacitor causes the slew rates of a current pulse generated by a PWM sensor to be degraded beyond the allowed tolerance windows specified for the automotive application (e.g., the transmission control unit).

Therefore, an improved device that can meet both the specification of the automotive application and the RI 130 test may be desirable.

SUMMARY

Embodiments provide a sensor device that includes a two-pin current interface including an input pin configured to draw an input current into the sensor device and an output pin configured to output an output current from the sensor device, where the output current is derived from the input current; a sensor configured to generate a measurement signal based on a measured quantity; and a current modulator configured to generate a current pulse as the output current such that the output current toggles between at least two main current states based on the measurement signal. The current modulator is further configured to modulate the output current such that the output current is increased, to first current level greater than the at least two main current states, at an initial phase of the current pulse for a first duration, and to modulate the output current such that the output current is decreased, to a second level less than the at least two main current states, at a terminal phase of the current pulse for a second duration.

Embodiments further provide a method of modulating current flowing through a two-pin current interface of a sensor device. The method includes drawing an input current into the sensor device; outputting an output current from the sensor device, wherein the output current is derived from the input current; generating a measurement signal based on a measured quantity; generating a current pulse as the output current such that the output current toggles between at least two main current states based on the measurement signal; and modulating the output current such that the output current is increased, to a first current level greater than the at least two main current states, at an initial phase of the current pulse for a first duration, and such that the output current is decreased, to a second level less than the at least two main current states, at a terminal phase of the current pulse for a second duration.

BRIEF DESCRIPTION OF THE DRAWINGS

Embodiments are described herein making reference to the appended drawings.

FIG. 1A is a schematic block diagram of a sensing system according to one or more embodiments;

FIG. 1B is a schematic diagram of a system circuit according to one or more embodiments;

DETAILED DESCRIPTION

Figure 2A:
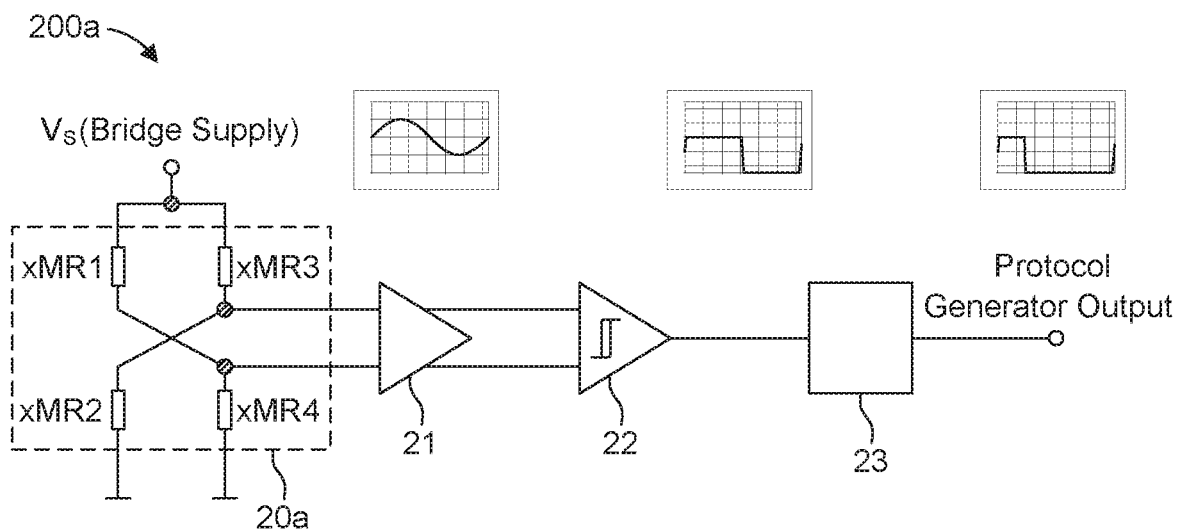
FIGS. 2A-2C are schematic block diagrams of sensor IC according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "front", "behind", "back", "leading", "trailing", "below", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may for example comprise a magnetic field, an electric field, a pressure, a force, a temperature, a current, or a voltage, but is not limited thereto. A sensor device, as described herein, may be a voltage sensor, a current sensor, a temperature sensor, a magnetic sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

Magnetic sensors include magnetoresistive sensors and Hall-effect sensors (Hall sensors), for example. Magnetoresistance is a property of a material to change the value of its electrical resistance when an external magnetic field is applied to it. Some examples of magnetoresistive effects are Giant Magneto-Resistance (GMR), which is a quantum mechanical magnetoresistance effect observed in thin-film structures composed of alternating ferromagnetic and non-magnetic conductive layers, Tunnel Magneto-Resistance (TMR), which is a magnetoresistive effect that occurs in a magnetic tunnel junction (MTJ), which is a component consisting of two ferromagnets separated by a thin insulator, or Anisotropic Magneto-Resistance (AMR), which is a property of a material in which a dependence of electrical resistance on the angle between the direction of electric current and direction of magnetization is observed. For example, in the case of AMR sensors, a resistance for an AMR sensor element changes according to a square of a sine of an angle of the magnetic field component projected on a sensing axis of the ARM sensor element.

The plurality of different magnetoresistive effects is commonly abbreviated as xMR, wherein the "x" acts as a placeholder for the various magnetoresistive effects. xMR sensors can detect the orientation of an applied magnetic field by measuring sine and cosine angle components with monolithically integrated magnetoresistive sensor elements.

Magnetoresistive sensor elements of such xMR sensors typically include a plurality of layers, of which at least one layer is a reference layer with a reference magnetization (i.e., a reference direction). The reference magnetization provides a sensing direction corresponding to a sensing axis of the xMR sensor. Accordingly, if a magnetic field component points exactly in the same direction as the reference direction, a resistance of the xMR sensor element is at a maximum, and, if a magnetic field component points exactly in the opposite direction as the reference direction, the resistance of the xMR sensor element is at a minimum.

In some applications, an xMR sensor includes a plurality of magnetoresistive sensor elements, which have different reference magnetizations. Examples of such applications, in which various reference magnetizations are used, are angle sensors, compass sensors, or specific types of speed sensors (e.g., speed sensors in a bridge arrangement referred to as monocells).

By way of example, such magnetoresistive sensor elements are used in speed, angle, or rotational speed measuring apparatuses, in which magnets may be moved relative to an magnetoresistive sensor elements and hence the magnetic field at the location of the magnetoresistive sensor element changes in the case of movement, which, in turn, leads to a measurable change in resistance. For the purposes of an angle sensor, a magnet or a magnet arrangement may be applied to a rotatable shaft and an xMR sensor may be arranged stationary in relation thereto.

A Hall effect sensor is a transducer that varies its output voltage (Hall voltage) in response to a magnetic field. It is based on the Hall effect which makes use of the Lorentz force. The Lorentz force deflects moving charges in the presence of a magnetic field which is perpendicular to the current flow through the sensor or Hall plate. Thereby, a Hall plate can be a thin piece of semiconductor or metal. The deflection causes a charge separation which causes a Hall electrical field. This electrical field acts on the charge in the opposite direction with regard to the Lorentz Force. Both forces balance each other and create a potential difference perpendicular to the direction of current flow. The potential difference can be measured as a Hall voltage and varies in a linear relationship with the magnetic field for small values. Hall effect sensors can be used for proximity switching, positioning, speed detection, and current sensing applications.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

According to one or more embodiments, a sensor and a signal processing circuit may be both accommodated (i.e., integrated) in the same chip package (e.g., a plastic encapsulated package, such as leaded package or leadless package, or a surface mounted device (SMD)-package). This chip package may also be referred to as sensor package.

FIG. 1A is a schematic block diagram of a sensing system 100a according to one or more embodiments. In particular, the system 100a includes a supply 1, a wire harness 2, a sensor-interface 3, and a multi-pin sensor chip 5. The multi-pin sensor chip 5 receives an input signal from the supply 1 and outputs an output signal to the sensor-interface 3 based on measuring a physical quantity (e.g., magnetic field, temperature, etc.). The wire harness 2 provides the input signal and output signal to/from the sensor chip 5. The sensor-interface 3 may include a device that processes the output signal.

FIG. 1B is a schematic diagram of a system circuit 100b according to one or more embodiments. The system circuit 100b includes a voltage supply 1, a two-wire harness 2, a filter circuit 3, and a microcontroller 4. In addition, a sensor 5 includes to leads Vs and GND that are connected to a respective wire of the two-wire harness 2. The sensor 5 is configured as a current sink, which sinks current Iin from the supply side (i.e., the voltage supply side) via lead Vs and outputs current Iout to the microcontroller side of the circuit 100b via lead GND. In a two pin device, such as sensor 5, sinked current Iin and the output current Iout are equal. Thus, the sensor implements a two-pin current sensor interface. The sensor 5 may also be referred to as a sensor chip, a sensor integrated circuit (IC), or a sensor package.

In a three-pin device (not shown), the sinked current Iin and the output current Iout may be proportional. For example, the output current Iout is derived from the Iin, and may be substantially equivalent to the sinked current Iin with the exception that part of the sinked current Iin (i.e., Ichip) is consumed by the components of the sensor IC of sensor 5. Therefore, Iout may be represented as Iin–Ichip.

In addition, the voltage supply 1 includes a battery 6 and may include a regulator 7 for regulating the supply voltage thereof. In an automotive application, for example, the battery 6 may be a vehicle battery. A capacitor (e.g., 10 nF) may be provided at the output of the voltage supply 1 for smoothing.

The voltage supply 1 is electrically coupled to a supply wire 8 of the two-wire harness 2. The supply wire 8 may include an RLC circuit with a resistor connected in series to an inductor and a (small) capacitance in parallel to ground. The other end of the supply wire 8 is electrically coupled to the Vs lead of the sensor 5 and provides power thereto.

On the other end of the sensor 5, an output wire 9 of the two-wire harness 2 is electrically coupled to the lead GND of the sensor 5. The output wire 9 may include an RLC circuit with a resistor connected in series to an inductor and a (small) capacitance in parallel to ground, and may be configured to receive an output current Tout provided by the sensor 5.

A capacitor 10 (e.g., 22 nF) is connected in parallel to the sensor 5. Specifically, the capacitor 10 is coupled between the two leads of the sensor 5, lead Vs and lead GND. Consequently, the capacitor 10 is also connected to each wire 8 and 9 of the two-wire harness 2.

The filter circuit 3 is coupled between the output wire 9 of the two-wire harness 2 and the microcontroller 4, and is configured to receive the output current 9 and to remove unwanted components and characteristics thereof. The filter circuit 3 is also coupled to a measurement resistor 11 (e.g., 250Ω) which draws the output current Tout. Thus, the output current Tout flows through the measurement resistor 11 and results in a voltage Vout at node N1 based on the current value of output current Tout. This voltage at node N1 necessarily results in a voltage Vout' at node N2 based on the voltage drop across the resistor between the nodes N1 and N2. Node N2 is coupled to the microcontroller 4. Thus, the microcontroller 4 is configured to receive the voltage Vout' and to take this voltage as a voltage measurement to perform additional functions. The output current Tout is configured to change based on a sensed quantity by the sensor 5. Hence, the voltage Vout' is also configured to change based on the output of the sensor 5.

Alternatively, the output current Iout may also be measured directly with a current mirror in the microcontroller 4 or in an sensor-interface chip.

For example, the microcontroller 4 may be a transmission control unit (TCU) or any other type of electronic control unit (ECU). The microcontroller 4 is configured to measure the output voltage Vout' that changes according to the output current of the sensor 5, and to determine a characteristic of the measured quantity (e.g., magnetic field, temperature, etc.). Based on the determined characteristic of the measured quantity, the microcontroller 4 may calculate other variables such as wheel speed, engine speed, transmission speed, temperature, etc., to be described below.

The automotive industry requires electronic components to pass an electromagnetic compatibility (EMC) test called RI 130. Coupled immunity requirements, also referred to as RI 130, are requirements related to component immunity from wire-to-wire coupling of unintended transient disturbances. These disturbances originate from switching of inductive loads including solenoids and motors. To satisfy RI 130, a device is to operate without deviation from RI 130 requirements when exposed to coupled transient electromagnetic disturbances created from switch contact arching and bounce.

This test applies also to two-wire speed sensors, such as transmission speed sensors. In order to be able to pass this test, it has been identified that in parallel to the sensor that a capacitor, typically of the size of 22 nF, has to be used. However, the use of the capacitor causes the slew rates of a current pulse generated by the sensor 5 to be degraded beyond the allowed tolerance windows specified for the automotive application (e.g., for the TCU).

For example, with the capacitor 10 connected between the leads of the sensor 5, the slew rates are inadequate for the microcontroller 4. As a result, the microcontroller is unable to correctly detect the output of the sensor 5. This can lead to protocol errors or misunderstandings.

In order to function with the proper slew rates when switching the output current Tout, the slew rate should be improved by charging and discharging the capacitor 11 at a faster rate. Specifically, the capacitor should be more quickly charged and discharged when a output state of the output current Tout is changing. Thus, the sensor 5 can be regarded as a multi-level current modulator.

While embodiments herein describe the sensor 5 as a PWM speed sensor in automotive applications, it will be appreciated this is but one example and the embodiments are not limited thereto. The embodiments apply to any switching sensor (e.g., PWM sensor or magnetic switch sensor) or PWM switching device with a two-wire interface.

A sensor includes one or more sensor elements, as described above, which may be magnetic field sensor elements, temperature sensor elements, etc. A PWM switching device is a device that generates multi-level current outputs based on a protocol such that one or more output pulses are generated in response to a condition or rule established by the protocol. The sensor or PWM switching device may include a protocol generator that is programmed with the protocol and which is configured to generate multi-level current outputs based on the protocol. The protocol generator may also be referred to as a current modulator.

In other cases, embodiments may be applicable not only to PWM sensors, but to any sensor (i.e., sensor package or sensor IC) with a two-wire interface and that is configured to generate multi-level current outputs based on a protocol. For example, a sensor implementing a duty-cycle protocol may be used. If using a temperature sensor, the temperature sensor may be configured to generate a digital code in the form of a multi-level output current based on a measured temperature.

A sensor used as a magnetic switch, such as a magnetic position sensor, may also be used. For example, an output current pulse may be generated (triggered) when a magnetic field is detected as being present at the sensor (i.e., at the one or more magnetic field sensor elements), and the sensor may generate a current under normal conditions in a steady state, for example, in normal mode, when a magnetic field is not present. Alternatively, the output current may be generated at a higher value for a duration that a magnetic field is detected as being present at the sensor, and generated at a lower value for a duration that the magnetic field is not present.

In other cases, the principles described herein may be applied to devices that implement other communication protocols and digital interfaces, such as a Musical Instrument Digital Interface (MIDI), industrial current interface (e.g., DIN 66258), and communication interfaces (e.g., wired phones, telex, teleprinter, and teletypewriter (TTY)-interface).

Magnetic speed sensors are used in speed sensing for many applications in automotive industry to calculate wheel speed, engine speed, and transmission speed. Sensor 5 in the following examples may be a PWM sensor having a two-wire current interface with capacitor 11 connected in parallel across the sensor leads.

The sensor 5 uses current PWM on the supply leads 8 and 9 to transmit information (i.e., the sensor output) to the microcontroller 4 regarding the state of the magnetic field, which the microcontroller 4 translates into a state of a target wheel. The target wheel may be a toothed wheel in combination with a back-bias magnet attached to the sensor-chip or a pole wheel having alternating magnetic poles on the circumference of the wheel. As the target wheel rotates, a magnetic field impinging upon the sensor 5 oscillates between two extrema. Rotation speed and rotation direction of the target wheel can be derived by the microcontroller 4 based on the output current generated by the sensor 5.

Thus, the microcontroller 4 is a sensor interface configured to received sensor output signals and to perform a function based on the received sensor output signals. Here, the sensor output signals are current outputs from the sensor 5 that are converted into a voltage Vout' by the filter circuit 3.

For example, the sensor 5 may be configured to toggle the output current Iout between at least two values (e.g., between 7 mA and 14 mA). That is, the sensor 5 is a multi-level current modulator with at least two current switching states.

Figure 2B:
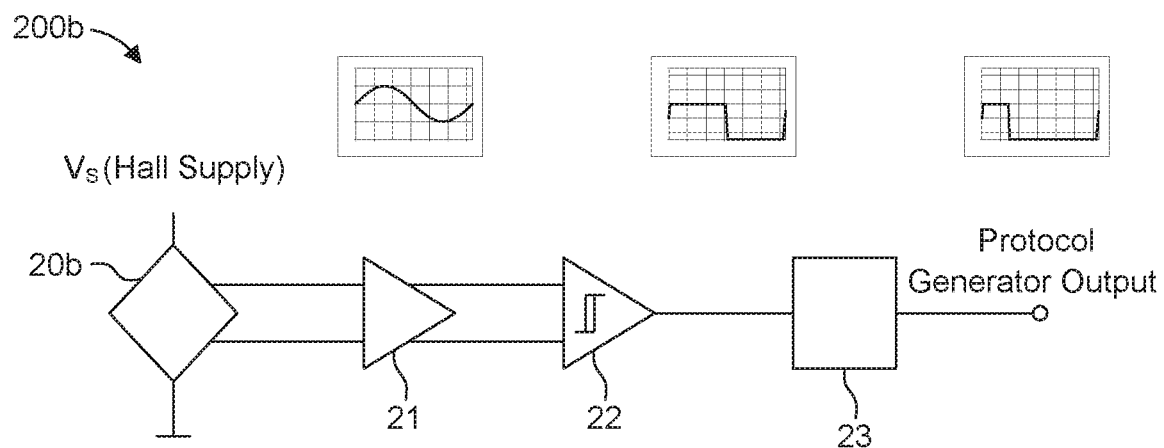
Figure 2C:
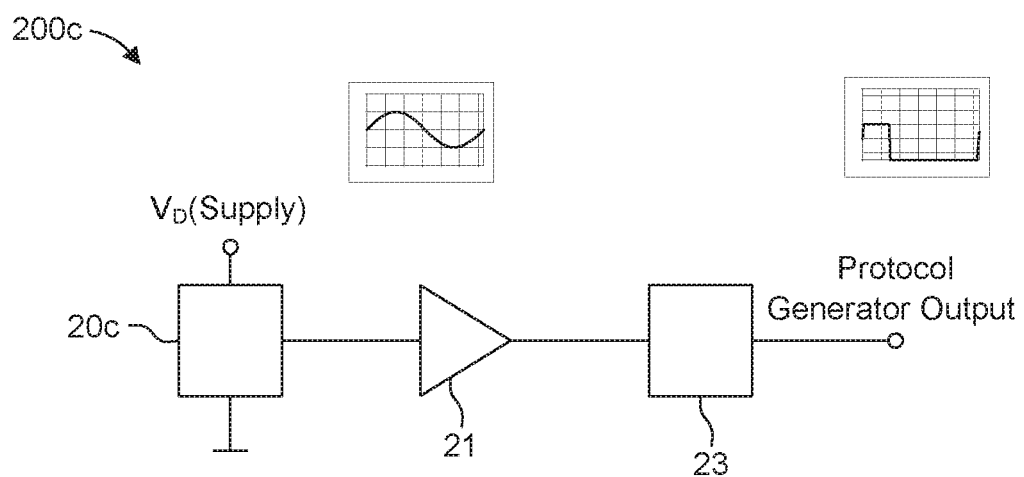

FIGS. 2A-2C are schematic block diagrams of sensor IC according to one or more embodiments. In particular, FIG. 2A shows a magnetic speed sensor 200a that includes a magnetic sensor 20a, an amplifier 21, a comparator 22, a current modulator 23.

The magnetic sensor 20a is an xMR-bridge that converts a magnetic field into a voltage represented as a sinusoidal waveform based on an oscillating magnetic field produced by a rotating target wheel. The voltage may also be referred to as measurement signal.

The amplifier 21 amplifies the analog output voltage of the magnetic sensor 20a to be used by the comparator 22.

The comparator 22 is configured to compare the amplified measurement signal to a switching threshold to generate a square wave based on the comparison results.

The current modulator 23, also referred to as a protocol generator, receives the output of the comparator 22 and generates an output current Iout according to a programmed current switching protocol or rule set. Thus, the current modulator 23 determines a current value to output, selected from multiple current levels or states.

The current modulator 23 includes at least one processor and may switch, according to the current switching protocol, between two current values for a predetermined time period (coded in the protocol) based on whether a target wheel is rotating in one direction (e.g., clockwise) or in another direction (e.g., counterclockwise). In one example, the comparator 22 detects a zero-crossing in a rising or falling direction (i.e., rising or falling edge) of the amplified measurement signal. Each detected zero crossing may generate one current pulse during which the output current is switched from a first output current state to a second output current state. The zero-crossing may not occur at zero, but may instead occur as some predetermined offset and may be regarding in general at a threshold crossing or a switching crossing. Thus, the output of the comparator 22 provides starting point of output current pulse.

For rotation direction detection of a wheel, two signal paths that have a phase- or time-shift are used. This can be achieved by having a second sensor bridge that is spatially shifted or by a single center sensing element. Meaning we have a "speed"-bridge signal and a phase (time shifted) "dir"-signal.

In a first method, at each zero-crossing of the speed-signal a sample of the phase-shifted dir-signal is taken. The difference of two consecutive dir-samples in connection to whether the first sample was taken at a rising- or falling zero-crossing of the speed-signal determines the direction.

In a second method, if two spatially separated sensor bridges are used, the rotation direction can be determined by using the information of which zero-crossing of which sensor bridge was earlier than the other.

As noted above, the current modulator 23 is a protocol generator that receives the comparator output and determines an output current Iout, selected from multiple current states, and a pulse width (duration) for the output current pulse based on the coded protocol linked to measured values of the measured quantity. While two current levels or states have been described thus far, the current modulator 23 is configured to generate at least two additional current levels in order to shape the output current Iout in view of the capacitor 10 shown in FIG. 1. That is, the output current Iout is shaped in order to improve the slew rate of the current pulse.

Referring back to FIG. 1, the sensor 5 includes current modulator 23 that is configured to shape of the output current Iout of the sensor 5 such that the capacitor 10 is charged and discharged more quickly when toggling between two or more main current states (e.g., when toggling between 7 mA and 14 mA). Different communication protocols (e.g., PWM-protocol or AK-protocol) may use a different number of main current states. In order to do so, additional current is driven in the sensor IC during an initial phase of current pulse of output current Tout, and current is subtracted from the output current Tout or the output current Tout in a terminal phase of the current pulse when the current pulse has ended.

In the examples herein, current modulator 23 sinks from the voltage supply side to provide output current Tout at 7 mA in a normal mode, and at 14 mA when generating a current pulse.

As will be described in more detail below, the current modulator 23 includes a current mirror that is switched on and off, in addition to the current consumption of the sensor IC. By switching the current mirror between two states (i.e., ON and OFF), additional current can be added when the current mirror is turned on and taken away when the current mirror is turned off. In this way, the current modulator may switch between 7 mA and 14 mA, for example, when the current mirror is off and on, respectively.

Additional current mirrors may be provided to expand the current modulator 23 beyond two output current states, and are switched on and off for predetermined durations according to the coded protocol linked to measured values of the measured quantity. Thus, the current modulator may be regarded as a multi-current level source/sink device.

By turning on one or more current sources in a multi-level current mirror configuration, the current modulator 23 is configured to inject additional current greater than the pulse current level for a predetermined duration to produce a sufficient rise time on the rising edge of the current pulse.

In the alternative, the current modulator 23 is configured to switch off one or more current sources in the multi-level current mirror configuration such that output current Tout falls below the normal current state (e.g., the 7 mA state). For example, the output current may be reduced to a base current that is lower than the normal current output. The base current may be an minimum operational current of the sensor IC. Thus, the base current represents the current flowing through the rest of the sensor IC, which is used for current consumption for the operation of the rest of the sensor IC. In other words, the current modulator 23 may be turned off while the remaining components of the sensor 5 remain operational.

In regards to the current switching protocol used to toggle between the two main current states, a 50% duty cycle protocol may be used. Here, switching occurs at every zero-crossing or switching crossing of the sensed quantity (e.g., the sensed magnetic field). That is, the switching for the current pulse generation may occur at the rising edge and the falling edge of the sensor measurement signal crossing the switching threshold.

Alternatively, the output current pulse may have a predefined duration (i.e., pulse length) depending on a satisfied condition of the sensed quantity (e.g., the sensed magnetic field). For example, an output current pulse may be generated for a first predetermined duration (e.g., 45 μsec current pulse) at a rising edge switching crossing while a target wheel rotates in a first rotation direction (e.g., clockwise direction). Alternatively, an output current pulse may be generated for a second predetermined duration (e.g., 90 μsec current pulse), different from the first predetermined duration, at a rising edge switching crossing while a target wheel rotates in a second rotation direction (e.g., counterclockwise direction).

It will also be appreciated that a similar scheme may be implemented using the falling edge of the sensor signal with respect to the switching crossing. Thus, only one trigger condition is implemented based on the sensor signal and a switching threshold per magnetic period of the sensor signal.

Thus, each output current pulse may have a length for a portion of the magnetic signal (e.g., 50% duty ratio) or for a predefined duration based on a rising or falling edge of the sensor signal crossing a switching threshold. The microcontroller 4 is configured to detect a pulse, converted into a voltage value or signal by the filter 3, and detect the duration thereof to determine a condition coded into the pulse (e.g., speed of rotation, degree of rotation, direction of rotation, etc.).

FIG. 2B shows a magnetic speed sensor 200b that includes a magnetic sensor 20b, an amplifier 21, a comparator 22, a current modulator 23. The magnetic speed sensor 200b is similar to magnetic speed sensor 200a, with the exception that a Hall sensor is used instead of a xMR-bridge sensor. The magnetic sensor 20b is a Hall sensor that converts a magnetic field into a voltage represented as a sinusoidal waveform based on an oscillating magnetic field produced by a rotating target wheel.

FIG. 2C shows a temperature sensor circuit 200c that includes a temperature sensor 20c, an amplifier 21, and a current modulator 23. The temperature sensor is configured to convert a temperature into a voltage. The current modulator 23 receives an amplified measurement signal from the amplifier 21 and may output a digital code in the form of a multi-level output current based on the voltage level of the measurement signal (i.e., based on the measured temperature).

Figure 3A:
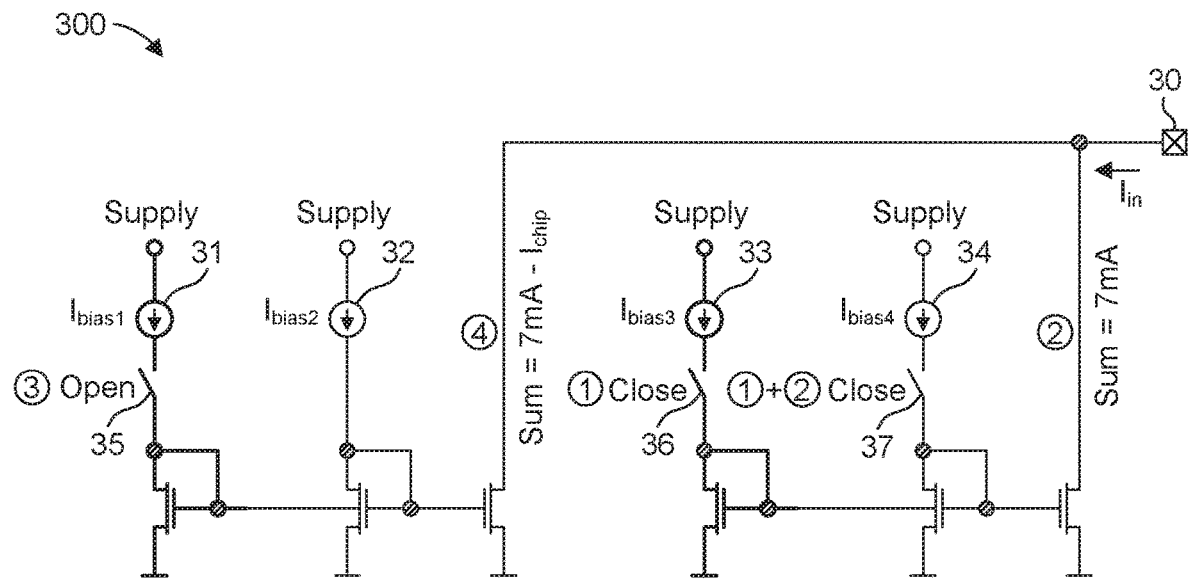
FIG. 3A is a circuit schematic of a current modulator circuit implemented in a current modulator according to one or more embodiments.
Figure 3B:
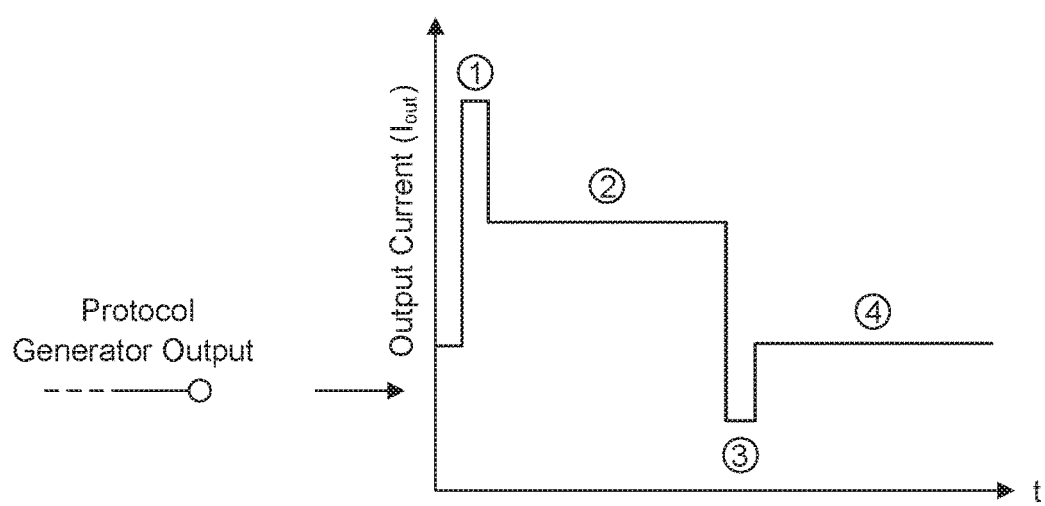
FIG. 3B is an example current diagram of a current output over time according to the current modulator circuit shown in FIG. 3A.

FIG. 3A is a circuit schematic of a current modulator circuit 300 implemented in a current modulator according to one or more embodiments. FIG. 3B is an example current diagram of a current output Iout over time according to the current modulator circuit 300 shown in FIG. 3A. In the current diagram, different current levels or states are numbered 1-4, and correspond to different switch states shown in the current modulator circuit 300 in FIG. 3A.

The current modulator circuit 300 may be implemented in any of the current modulators described herein. The current modulator circuit 300 is a current mirror with multiple switchable current sinks. Thus, the current modulator circuit 300, in general, is configured as a current sink to sink from the voltage supply side to toggle between to two or more main current states based on a current switching protocol. The current modulator circuit 300 includes a supply pad 30 coupled to the lead Vs of the sensor 5. Here, the current modulator circuit 300 is configured to provide output current Tout at 7 mA in a normal mode, and at 14 mA when generating a current pulse.

The current modulator circuit 300 is a multi-level current mirror with multiple converters to generate the output current Tout. For example, four current sinks 31, 32, 33, and 34 and three switches 35, 36, and 37 are provided. Current sinks 31, 32, 33, and 34 provide currents Ibias1, Ibias2, Ibias3, and Ibias4, respectively, having a current of 3.5 mA, 3.5 mA, 7 mA, and 7 mA, respectively. Switches 35, 36, and 37 are coupled in series with a respective current sink, and are configured to couple and decouple its respective current sink from the rest of the current mirror. Coupled current sinks may be referred to as active current sinks or connected current sinks, and decoupled current sinks may be referred to as inactive current sinks or disconnected current sinks. The switches 35, 36, and 37 are controlled by a processor, a controller (not shown), and/or a digital network (sequential-logic) that implements the current switching protocol of the current modulator.

While not show, a switch may also be provided in series with current sink 32 to switchably couple and decouple current sink 32 from the circuit. This would lead to the minimum current that the rest of the chip consumes (i.e., Ichip).

In particular, when a current sink is coupled to the rest of the current mirror, the current sink adds to the amount of current sinked Iin from the voltage supply 1, and the output current Tout is increased. In contrast, when a current sink is decoupled from the rest of the current mirror, the current sink does not add to the amount of current sinked Iin from the voltage supply side, and the output current Tout is reduced.

It will be further noted that current sink 32 is connected such that at least a minimum current Ichip can be drawn into the sensor IC for basic functionality thereof (i.e., to care for the difference between the low-current-level (7 mA) and the current consumption for the rest of the chip). Current Ichip is the current consumption of the rest of the sensor chip, excluding the current modulator. The rest of the sensor chip or IC is connected in parallel to the supply pad 30. When the current sink 32 is the only active current sink, the sensor IC may be regarded as being in a low power consumption state, which may further be a minimum power consumption state. In this state, capacitor 10 may be discharged more quickly as opposed to when a larger current is being drawn into the sensor IC.

Current states 2 and 4 are regarded as the main current states between which the current modulator toggles. However, it will be appreciated that more than two main current states may be implemented. For example, a communication protocol, such as an AK-protocol, could also use three main current states. Here, current state 4 corresponds to a normal current output mode, while current state 2 corresponds to a current pulse. In addition, current state 1 is an increased current state used to inject additional current for a limited duration in order to reduce the charging time of the capacitor 10 during an initial phase of the current pulse (i.e., at a transition from current state 4 to current state 2, which may also referred to as rising edge). Current state 3 is a reduced current state used to reduce the discharging time of the capacitor 10 during a terminal phase of the current pulse when the current pulse has ended (i.e., at a transition from current state 2 to current state 4, commonly also referred to as falling edge).

Switch 35 is closed during current states 1, 2, and 4, and is open during current state 3. Switch 36 is closed during current state 1, and is open during current states 2-4. Switch 37 is closed during current states 1 and 2, and is open during current states 3 and 4. The result is a transition of the sinked current between four current states.

The current sinks are connected in parallel between the sensor leads Vs and GND and in parallel with the capacitor 10. When a current pulse is provided, the output current is toggled to 14 mA by active current sinks 31, 32, and 34. In addition, current sink 33 is activated during an initial phase of the current pulse. For example, 7 mA provided by current sink 33 is additionally injected for the first 4 μs. This means that during these 4 μs, the current consumption of the silicon is increased to 21 mA. However, the current consumption of the sensor (i.e., where with sensor and the silicon together with the capacitor 10 are defined) is still increasing between 7 mA to 14 mA. After these initial 4 μs, the current sink 33 is switched off and the consumption of the silicon is switched to 14 mA.

The current pulse may have length in the range of 30-45 μs, but is not limited thereto. At the end of the current pulse, similar to the first part, a short current pulse with direction opposite to the one provided by current sink 33 is provided. In this state (i.e., current state 3), all switches 35-37 are open such that the sinked current is reduced to a minimum value (e.g., 3.5 mA). Since in this case the discharging current is limited to 3.5 mA and not to 7 mA as during the charging phase, the time when the additional sink is switched on is doubled to 8 μs to allow for sufficient discharge of the capacitor 10. The larger the capacitor, the larger the duration of current states 1 and 3 should be. Additionally, current sink 32 may also be disconnected curing current state 3. By decoupling current sink 32, this would lead to the minimum current that the rest of the chip consumes (i.e., Ichip).

The current modulator including the current modulator circuit 300 increases the charge rate of the capacitor to steady state, and also increases the discharge rate of the capacitor to steady state during the rise time and fall time of the output current pulse, respectively.

Thus, a multilevel current level sink is used to perform current switching in a case a capacitor is attached to the sensor leads of the sensor 5. By including the capacitor, the sensor 5 is able to pass the RI 130 EMC test, while still satisfying an acceptable current pulse slew rate for the microcontroller 4. The microcontroller 4 measures the output voltage that changes according to the output current of the sensor 5, and determines a characteristic of the measured quantity (e.g., wheel speed, engine speed, transmission speed, temperature, etc.). For example, when a output current pulse is generated by sensor 5, a voltage pulse is generated at node N2 as Vout'. The microcontroller 4 detects this pulse and performs additional processing based thereon.

An additional flexibility could be added by adding trimmings for the additional current switched during the initial and final phase of the current pulse. Both time and current of the additional current sinks (e.g., Ibias1 and Ibias3) could be made trimmable.

Figure 4A:
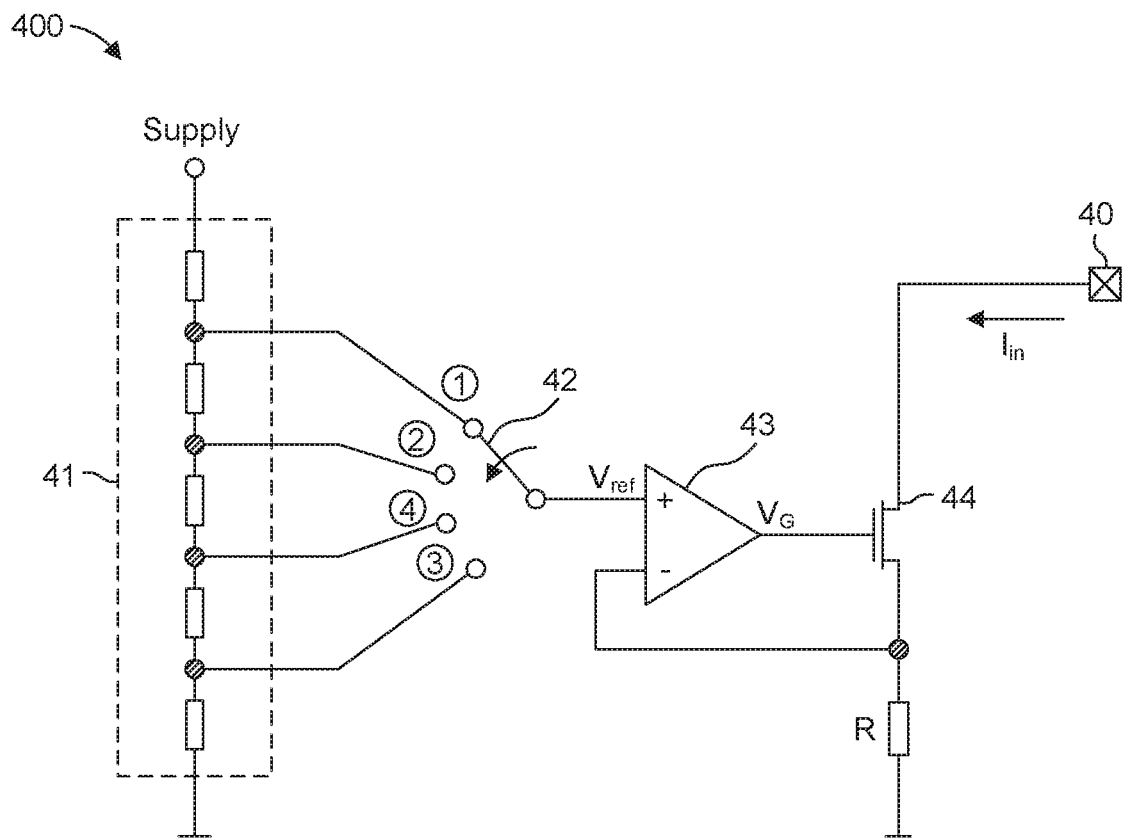
FIG. 4A is a circuit schematic of a current modulator circuit implemented by a current modulator according to one or more embodiments.
Figure 4B:
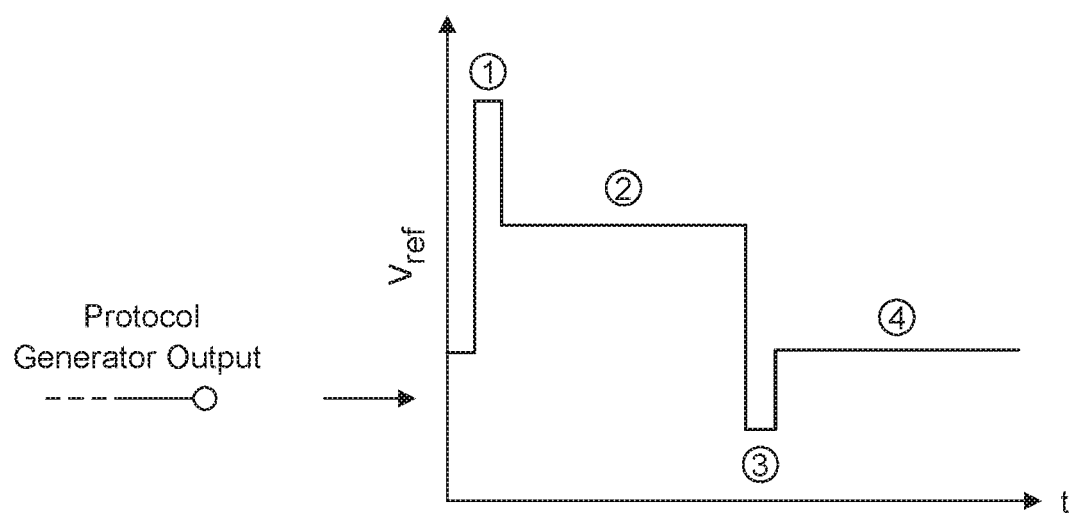
FIG. 4B is an example voltage diagram of a reference voltage of an operational amplifier over time according to the current modulator circuit shown in FIG. 4A.

FIG. 4A is a circuit schematic of a current modulator circuit 400 implemented by a current modulator according to one or more embodiments. FIG. 4B is an example voltage diagram of a reference voltage Vref of an operational amplifier (op amp) over time according to the current modulator circuit 400 shown in FIG. 4A. In the voltage diagram, different voltage levels or states are numbered 1-4, and correspond to different switch positions 1-4 shown in the current modulator circuit 400 in FIG. 4A. The different voltage states of Vref result in different amounts of current sinked from the voltage supply side. Thus, output current Iout changes according to the sinked current Iin.

The current modulator circuit 400 includes a supply pad 40 coupled to the lead Vs of the sensor 5. Here, the current modulator circuit 400 is configured to provide output current Iout at 7 mA in a normal mode, and at 14 mA when generating a current pulse.

The current modulator circuit 400 includes a voltage divider 41 having resistors connected in series, a switch 42, an op amp 43, and a transistor 44. The switch 42 may be a single pole multi-throw switch such that it provides a connection to one of the different nodes in the voltage divider 41. Each node of the voltage divider 41 has a different voltage value from increasing to decreasing value as the circuit progresses from the supply to ground. Thus, voltage levels decrease in the order of voltage state 1, 2, 4, and 3.

The switch 42 provides a connection from the voltage divider 41 to the non-inverting input of the op amp 43. The op amp 43 includes a negative feedback loop and outputs a voltage $V_G$ that is supplied to the control terminal (e.g., gate terminal) of the transistor 44. The amount of current that flows through the transistor 44 depends on the voltage $V_G$, and may be proportional to voltage $V_G$. That is, as voltage $V_G$ increases, so does the current Iin that flows through the transistor 44. The opposite is also true. As the voltage $V_G$ decreases, so does the current Iin that flows through the transistor 44. Here, voltage $V_G$ may operate between the turn-on voltage and the saturation voltage of the transistor 44.

Based on this arrangement, the reference voltage Vref is changed by connecting the non-inverting terminal across a resistor or series of resistors of the voltage divider 41. Due to the feedback loop connected to the inverting terminal of the op amp 43, the op amp 43 adjusts its output voltage $V_G$ such that the voltage difference between input terminals of the op amp 43 goes to zero. This change at voltage $V_G$ results in different current levels being achieved at the supply pad 40 when Vref is changed.

The switch 42 is controlled by a processor, a controller, and/or a sequential-digital logic (not shown) that implements the current switching protocol of the current modulator.

While various embodiments have been described, it will be apparent to those of ordinary skill in the art that many more embodiments and implementations are possible within the scope of the disclosure. For example, while specific current, voltage, and timing values are described in the examples above, the embodiments are not limited thereto. Furthermore, a number of current and voltage states is not limited to the number used in the examples above.

Accordingly, the embodiments are not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the embodiments illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the embodiments. It will be obvious to those reasonably skilled in the art that other components performing the same functions may be suitably substituted. It is to be understood that other embodiments may be utilized and structural or logical changes may be made without departing from the scope of the embodiments. It should be mentioned that features explained with reference to a specific figure may be combined with features of other figures, even in those not explicitly mentioned. Such modifications to the concepts are intended to be covered by the appended claims and their legal equivalents.

What is claimed is:

1. A sensor device comprising:
a two-pin current interface including an input pin configured to draw an input current into the sensor device and an output pin configured to output an output current from the sensor device, wherein the output current is derived from the input current;
a sensor configured to generate a measurement signal based on a measured quantity; and
a current modulator configured to generate a current signal based on the measurement signal, wherein the current signal comprises at least two main current states defining a current pulse, and wherein the output current toggles between the at least two main current states based on the measurement signal,
wherein the current modulator is further configured to modulate the output current such that the output current is increased to a first current level greater than the at least two main current states for a first duration, wherein the output current is increased to the first current level at an initial phase of the current pulse, and
wherein the current modulator is further configured to modulate the output current such that the output current is decreased to a second current level less than the at least two main current states for a second duration, wherein the second current level is equal to or greater than zero and the output current is decreased to the second current level at a terminal phase of the current pulse.

2. The sensor device of claim 1, wherein the current pulse has a pulse duration, and the first duration and the second duration are both less than the pulse duration.

3. The sensor device of claim 2, wherein the second duration is longer than the first duration.

4. The sensor device of claim 1, wherein the first duration is initiated at a rising edge of the current pulse and the second duration is initiated at a falling edge of the current pulse.

5. The sensor device of claim 1, wherein the current modulator is configured to regulate the input current drawn into the sensor device based on the measurement signal and a protocol linked to measured values of the measured quantity.

6. The sensor device of claim 5, wherein the output current is equal to the input current.

7. The sensor device of claim 1, further comprising:
a capacitor coupled to the input pin and the output pin.

8. The sensor device of claim 7, wherein a charging rate of the capacitor is increased during the first duration, and a discharging rate of the capacitor is increased during the second duration.

9. The sensor device of claim 8, wherein transitions between the at least two main current states in the output current have RI 130 compatibility.

10. The sensor device of claim 1, wherein:
the sensor device is a magnetic speed sensor device and the measurement signal generated by the sensor oscillates between two extrema when in the presence of an oscillating magnetic field, and
the current modulator is configured to generate the current pulse when the measurement signal crosses a switching threshold.

11. The sensor device of claim 1, wherein:
the sensor device is a temperature sensor device,
the sensor is configured to generate the measurement signal based on a measured temperature, and
the current modulator is configured to generate the current pulse based a digital code corresponding to the measured temperature represented by the measurement signal.

12. The sensor device of claim 1, wherein the current modulator comprises:
a current mirror comprising a plurality of current sinks that are switchably activated and deactivated based on a current switching protocol, wherein the input current changes according to which of the plurality of current sinks are activated and deactivated; and
a controller configured to switchably activate and deactivate the plurality of current sinks based on the current switching protocol.

13. The sensor device of claim 12, wherein the current mirror comprises a primary current sink that is fixedly activated such that at least a minimum current is drawn as the input current for supplying power to the sensor device.

14. The sensor device of claim 1, wherein the current modulator comprises:
an operational amplifier comprising a non-inverting terminal switchably connected to a plurality of voltages, an inverting terminal connected to a feedback loop, and an output terminal;
a transistor comprising a control terminal coupled to the output terminal of the operational amplifier, the transistor being configured to adjust the input current based on a voltage at the control terminal; and
a controller configured to switchably connect the non-inverting terminal to one of the plurality of voltages based on a current switching protocol to control the voltage at the control terminal.

15. The sensor device of claim 1, further comprising:
a controller configured to implement a current switching protocol; and
a current mirror comprising a plurality of branches connected in parallel, wherein each of the plurality of branches comprises a different one of a plurality of current sinks that are switchably activated to increase the input current and the output current based on the current switching protocol and are switchably deactivated to decrease the input current and the output current based on the current switching protocol,
wherein:
a first number of the plurality of current sinks, equal to or greater than zero, is activated to generate the second current level,
a second number of the plurality of current sinks, greater than the first number, is activated to generate a first main current state of the at least two main current states,
a third number of the plurality of current sinks, greater than the second number, is activated to generate a second main current state of the at least two main current states, and
a fourth number of the plurality of current sinks, greater than the third number, is activated to generate the first current level.

16. A method of modulating current flowing through a two-pin current interface of a sensor device, the two-pin current interface having an input pin and an output pin, the method comprising:

drawing an input current into the sensor device;
outputting an output current from the sensor device, wherein the output current is derived from the input current;
generating a measurement signal based on a measured quantity;
generating a current signal based on the measurement signal, wherein the current signal comprises at least two main current states defining a current pulse, and wherein the output current toggles between the at least two main current states based on the measurement signal;
modulating the output current such that the output current is increased to a first current level greater than the at least two main current states for a first duration, wherein the first duration is initiated at an initial phase of the current pulse;
modulating the output current such that the output current is decreased to a second current level less than the at least two main current states for a second duration, wherein the second current level is equal to or greater than zero and the second duration is initiated at a terminal phase of the current pulse.

17. The method of claim 16, wherein the current pulse has a pulse duration, and the first duration and the second duration are both less than the pulse duration.

18. The method of claim 17, wherein the second duration is longer than the first duration.

19. The method of claim 16, further comprising:
initiating the first duration at a rising edge of the current pulse; and
initiating the second duration at a falling edge of the current pulse.

20. The method of claim 16, further comprising:
regulating the input current drawn into the sensor device based on the measurement signal and a protocol linked to measured values of the measured quantity, wherein the output current is equal to the input current.

21. The method of claim 16, wherein a charging rate of a capacitor coupled to the input pin and the output pin is increased during the first duration, and a discharging rate of the capacitor is increased during the second duration.

22. The method of claim 16, further comprising:
controlling a plurality of current sinks that are coupled in parallel based on a current switching protocol, wherein the plurality of current sinks are switchably activated to increase the input current and the output current based on the current switching protocol and are switchably deactivated to decrease the input current and the output current based on the current switching protocol,
wherein:
a first number of the plurality of current sinks, equal to or greater than zero, is activated to generate the second current level,
a second number of the plurality of current sinks, greater than the first number, is activated to generate a first main current state of the at least two main current states,
a third number of the plurality of current sinks, greater than the second number, is activated to generate a second main current state of the at least two main current states, and
a fourth number of the plurality of current sinks, greater than the third number, is activated to generate the first current level.

* * * * *